US007656511B2

(12) United States Patent
Emerich et al.

(10) Patent No.: US 7,656,511 B2
(45) Date of Patent: Feb. 2, 2010

(54) SECURITY ELEMENT

(75) Inventors: Markus Emerich, Vienna (AT); Harald Deinhammer, Vienna (AT)

(73) Assignee: Oesterreichische Banknoten-und Sicherheitsdruck GmbH, Vienna (AT)

( * ) Notice: Subject to any disclaimer, the term of this patent is extended or adjusted under 35 U.S.C. 154(b) by 36 days.

(21) Appl. No.: 11/909,335

(22) PCT Filed: Mar. 16, 2006

(86) PCT No.: PCT/AT2006/000110

§ 371 (c)(1),
(2), (4) Date: Jun. 27, 2008

(87) PCT Pub. No.: WO2006/099642

PCT Pub. Date: Sep. 28, 2006

(65) Prior Publication Data

US 2009/0231572 A1 Sep. 17, 2009

(30) Foreign Application Priority Data

Mar. 21, 2005 (AT) ................................ A 481/2005

(51) Int. Cl.
*G06K 9/74* (2006.01)

(52) U.S. Cl. ........................................ 356/71; 235/491

(58) Field of Classification Search .................. 356/71; 235/491

See application file for complete search history.

(56) References Cited

U.S. PATENT DOCUMENTS

| | | | |
|---|---|---|---|
| 4,756,557 A | 7/1988 | Kaule et al. | |
| 5,118,349 A * | 6/1992 | Jalon | 106/31.15 |

FOREIGN PATENT DOCUMENTS

| | | |
|---|---|---|
| DE | 198 60 093 | 7/2000 |
| EP | 0 318 717 | 6/1989 |
| EP | 1 284 322 | 2/2003 |
| EP | 1 346 839 | 9/2003 |
| JP | 11 080632 | 3/1999 |
| WO | WO 2004/062942 | 7/2004 |
| WO | WO 2004/081125 | 9/2004 |

* cited by examiner

*Primary Examiner*—Roy Punnoose
(74) *Attorney, Agent, or Firm*—Henry M. Feiereisen; Ursula B. Day

(57) ABSTRACT

The invention relates to a security element (1), comprising a first luminescent substance, for a security document (5), the latter (5) comprising a base body (51) consisting of a base material. The aim of the invention is to increase the protection against forgery. To achieve this: the security element is provided with a second luminescent substance; energy is transmitted between the first luminescent substance and the second luminescent substance, whereby the frequency range of the excitation of one of the luminescent substances corresponds to the emission frequency range of the other luminescent substance; and the first luminescent substance is thermally unstable at the ignition temperature of the base material and/or at a temperature of 185° C.

12 Claims, 1 Drawing Sheet

SECURITY ELEMENT

BACKGROUND OF THE INVENTION

The invention relates to a security element for a security document, with said security document comprising a base body consisting of a base material, comprising a first luminescent substance.

It is known to provide banknotes with security elements with luminescent substances which are embedded in the base body or may be contained in a dye. Said substances can be excited in a simple way and the emitted light can be detected, which allows a check for genuineness to be performed easily. The disadvantageous aspect is that many of these luminescent substances can be extracted by burning the banknote and can be applied to forgeries with a higher value.

SUMMARY OF THE INVENTION

It is the object of the present invention to provide a security element of the kind mentioned above in which the known disadvantages are avoided, which can be checked easily and which offer a high amount of security against forgery.

This is achieved in accordance with the invention in such a way that a second luminescent substance is provided, that energy is transmitted between the first luminescent substance and the second luminescent substance, with the frequency range of the excitation of one of the luminescent substances corresponding to the emission frequency range of the other luminescent substance, and that the first luminescent substance is thermally unstable at the ignition temperature of the base material and/or at a temperature of 185° C.

When the other luminescent substance is excited by the emission of one of the luminescent substances, the presence of both substances can be checked in a very simple manner in one step. In this process, the ratio of the emission of the first luminescent substance to the second luminescent substance can be determined and can be used as a criterion for genuineness. By using at least one luminescent substance which is thermally unstable at the ignition temperature of the base material and/or at a temperature of 185° C., the security element cannot be extracted in its entirety after burning the banknote. When the second luminescent substance is thermally unstable, the presumption of genuineness can be confirmed through proof of this substance in a burned security document. Moreover, the first luminescent substance can be arranged so as to be unstable against acids, as a result of which the first luminescent substance cannot be extracted even in the case of a chemical degradation of the base material.

In a further development of the invention it can be provided that the emission frequency range is higher in the first luminescent substance than the frequency range of the excitation. By using an up converter it is possible to provide in a simple manner a light-resisting and thermally unstable luminescent substance which is preferably inorganic.

According to a further embodiment of the invention it can be provided that the frequency range of the excitation of the second luminescent substance corresponds to the emission frequency range of the first luminescent substance, with the first luminescent substance exciting the second luminescent substance. If the first luminescent substance is an up converter, then the energy of its emission is usually considerably lower than the excitation. By exciting the up converter by means of an external light source it is possible to easily ensure that sufficient energy is present for excitation of the second luminescent substance.

In a further embodiment of the invention it can be provided that the frequency range of the emission of the first luminescent substance is situated in the visible range, as a result of which the presence of the first luminescent substance can be detected easily with the naked eye insofar as a suitable light source is used for excitation. Such light sources can be infrared laser diodes for example which be provided in an easy and cost-effective manner, e.g. as key chains.

According to a further embodiment of the invention it can be provided that in the second luminescent substance the emission frequency range is lower than the excitation frequency range. Such conventional down converters show a favorable quantity yield, as a result of which sufficient emission of the second luminescent substance can be ensured even when using an up converter.

In a further development of the invention it can be provided that the first luminescent substance and the second luminescent substance are present in a predeterminable ratio, as a result of which the ratio of the emission of the first luminescent substance to the emission of the second luminescent substance is used as a further criterion for genuineness.

According to another embodiment of the invention it can be provided that a first section comprises the first luminescent substance and the second luminescent substance, and that a second section merely comprises the first luminescent substance. The presence of the substances in the sections can thus be determined very easily and can be used as a security criterion.

In this connection it can be provided in a further development of the invention that a third section merely comprises the second luminescent substance, by means of which the forgery of the security element is made even more difficult in combination with simple verifiability.

The invention relates further to a security document with a security element as described above.

The security document has the advantages described for the security element.

The invention further relates to a printing ink for a security element as described above, with the security element being applicable onto a security document with a base body made of a base material, comprising a first luminescent substance.

It is a further object of the invention to provide a printing ink of the kind mentioned above with which the security element can be produced in a simply manner.

This is achieved in accordance with the invention in that a second luminescent substance is provided, that energy transmission is provided between the first luminescent substance and the second luminescent substance, with the excitation frequency range of one of the luminescent substances corresponding to the emission frequency range of the other luminescent substances, and that the first luminescent substance is thermally unstable at an ignition temperature of the base material and/or at a temperature of 185° C.

This leads to the advantage that the security element can be produced easily in one printing process.

The invention further relates to a method for verifying the genuineness and/or the quality of a security document with a security element, comprising a first luminescent substance, with the first luminescent substance being excited by means of a light source.

It is known to excite security elements in banknotes which contain luminescent substances and to detect the emitted light. The disadvantageous aspect is that such luminescent substances can be extracted after burning the banknotes and can be applied to forgeries of a higher value, with known methods detecting such banknotes as genuine.

It is the object of the present invention to provide a method of the kind mentioned above in which the known disadvantages are avoided, with which a simple and rapid check can be performed and a high security from forgery can be ensured.

This is achieved in accordance with the invention in such a way that a second luminescent substance is excited by the emission of the first luminescent substance, and that the ratio of the emission of the first luminescent substance to the emission of the second luminescent substance is determined.

This leads to the advantage that in the emission of one of the luminescent substances the other of the luminescent substances is excited, with the presence of both substances together being capable of being checked in a simple manner. By determining the ratio of the emission of the first luminescent substance to the emission of the second luminescent substance, an additional criterion for genuineness is provided.

BRIEF DESCRIPTION OF THE DRAWING

The invention is explained in closer detail by reference to the enclosing drawings showing an embodiment, wherein.

DETAILED DESCRIPTION OF PREFERRED EMBODIMENTS

Figures 1, 2, 3, 4:
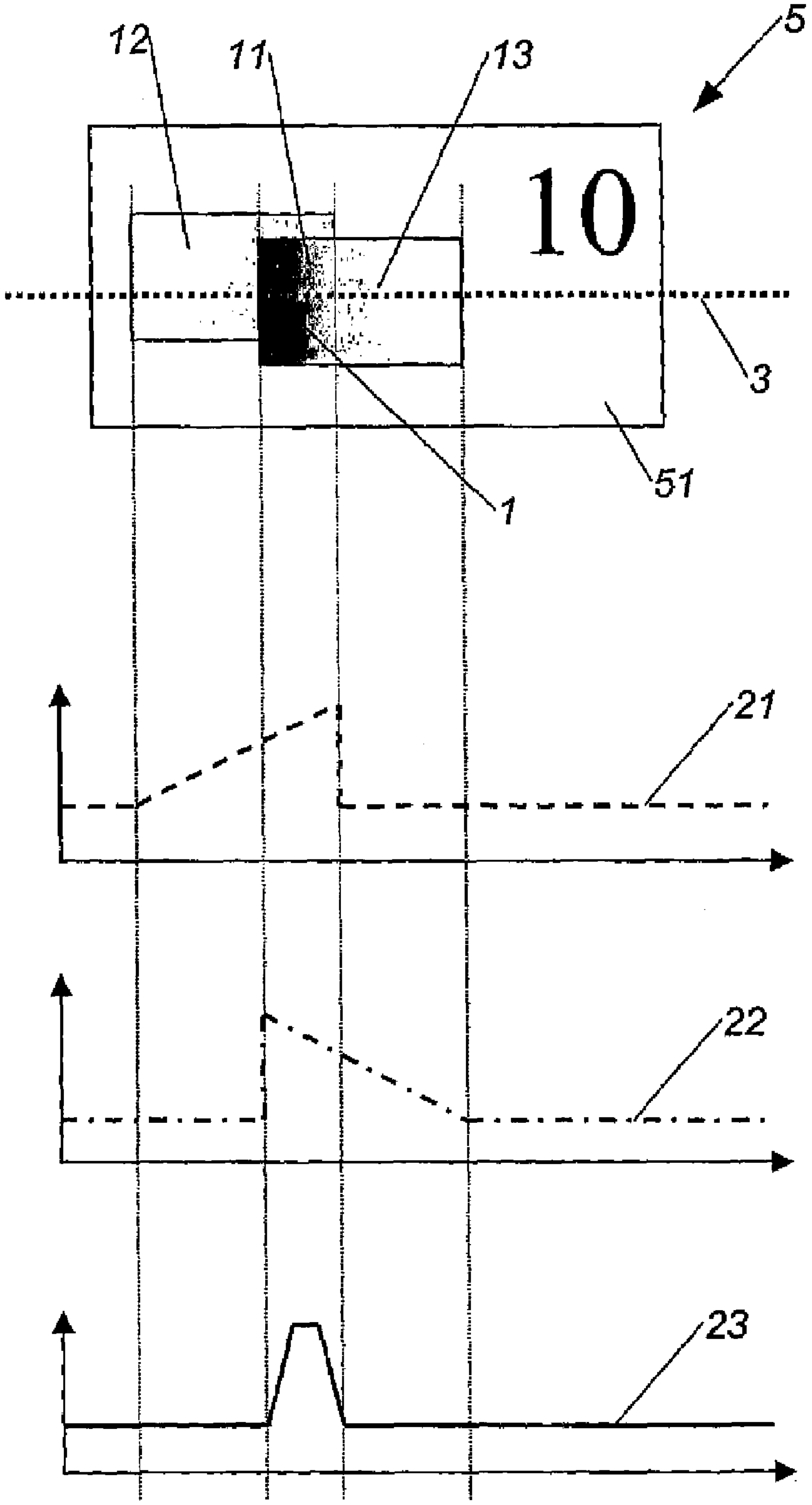
FIG. 1 shows a top view of a security document in accordance with the invention.
FIG. 2 shows the emission of the first luminescent substance when the same is excited.
FIG. 3 shows the emission of the second luminescent substance when the same is excited.
FIG. 4 shows the emission of the second luminescent substance when the first luminescent substance is excited.

FIG. 1 shows a top view of a security document 5 with a security element 1. The security document 5 comprises a base body 51 made of a base material. The security document 5 can be a banknote, a chipcard, a document or the like for example, with the base material being especially paper, cardboard, plastic or cotton. In other embodiments, the base material can also be a composite material. The security element 1 comprises a first luminescent substance and a second luminescent substance, with energy transmission being provided between the first luminescent substance and the second luminescent substance, with the excitation frequency range of one of the luminescent substances corresponding to the emission frequency range of the other of the luminescent substances. In this process, one of the luminescent substances is excited by the emission of the other luminescent substances. Both luminescent substances can be excited by the excitation of merely one of the luminescent substances by means of an external light source. The security element 1 can be arranged in such a way that the second luminescent substance is excited by the emission of the first luminescent substance, or also that the first luminescent substance is excited by the emission of the second luminescent substance.

The luminescent substances can be excited in a frequency range which lies about a frequency with maximum energy yield. Within the terms of the invention, the frequency range corresponds to the technically meaningful range where the energy yield corresponds to a predeterminable percentage rate of the maximum energy yield which can preferably be predetermined as larger than 10%, especially larger than 20%. The same also applies to the emission frequency range. The correspondence of the frequency ranges is given when there is an overlap of the frequency ranges, with preferably both frequencies lying with the maximum energy yield in the overlapping range. It is especially advantageous when the distance of the two frequencies with the maximum energy yield is less than 25%, preferably less than 10%, more preferably less than 5% of the total width of the overlapping range.

The first luminescent substance is thermally unstable at an ignition temperature of the base material and/or at a temperature of 185° C. Thermally unstable within the terms of the invention means that a chemical or physical conversion of the luminescent substance occurs, so that the luminescent properties are lost, or they change to such an extent that the change can be checked by a detector and the security document 5 can be sorted out. The ignition temperature is the lowest temperature at which the base material is excited to burn. For a security document 5 with a base material made of paper, the ignition temperature usually lies between 185° C. and 360° C.

Luminescent substances can be made of organic or inorganic materials, with organic materials often being thermally unstable, but come with the disadvantage that they are not light-resistant and are unsuitable without any respective security measures for security documents such as banknotes which are subjected to light. In contrast, most inorganic materials are thermally stable and can be extracted after burning of the security document.

In the case of the first luminescent substance, the emission frequency range can be higher than the excitation frequency range, with this concerning an up converter in this case. If an up converter is provided the first luminescent substance, a thermally unstable and light-resistant material can easily be provided.

Known up converters have a low quantity yield, which is why a strong excitation is required in order to cause a respective intensity of the emission. It appears to be advantageous when the security element 1 is arranged in such a way that the frequency range of the excitation of the second luminescent substance corresponds to the frequency range of the emission of the first luminescent substance. The up converter can be excited with high intensity by means of an external light source, as a result of which a sufficient emission is achieved in order to ensure an emission of the second luminescent substance which can be measured well.

When the emission frequency range of the first luminescent substance lies in the visible range, the emission can be detected with the naked eye. In the case of an up converter, the excitation can be made by means of an IR laser diode which can be provided in a simple and cost-effective way. The population at large can thus be provided with a means to check the genuineness of a security document 5 in a simple and rapid manner.

Down converters usually have a higher quantity yield than up converters, which is why it seems to be advantageous when the emission frequency range of the second luminescent substance is lower than the excitation frequency range.

An additional security feature is formed when the first luminescent substance and the second luminescent substance are presented at a predeterminable ratio. The ratio of the emission of the first luminescent substance to the emission of the second luminescent substance can be determined, with the ratio being determined by the respective quantities of the luminescent substances.

The security element 1 can be arranged in such a way that a first range 11 comprises the first luminescent substance and the second luminescent substance, a second region 12 the first luminescent substance, and a third region 13 merely the second luminescent substance. Such a security element 1 is shown in FIG. 1. FIG. 2 shows the emission of the first luminescent substance during its excitation. It can be seen that the concentration of the first luminescent substance is not constant and rises in the illustration from left to right. FIG. 3 shows the emission of the second luminescent substance during its excitation. It can be seen that the concentration of the second luminescent substance decreases in the illustration from the left to the right. FIG. 4 shows the emission of the second luminescent substance during excitation of the first luminescent substance. Emission only occurs in the first region 11 in which both luminescent substances are present. As a result of this interaction of the first luminescent substance and the second luminescent substance, a high security of the security document from forgery is achieved.

A different concentration of the first luminescent substance and/or the second luminescent substance can be achieved for example by means of different line widths and/or line spacing in the first region 11, the second region 12 and/or the third region 13. It is also possible to achieve the formation of barcodes by a respective arrangement of the regions 11, 12, 13.

In other embodiments of the security element 1 in accordance with the invention, it is possible to provide only the first region 11, the first region 11 and the second region 12, or the first region 11 and the third region 13.

In a method for verifying the genuineness and/or quality of the security document 5 with the security element 1, it is possible to use one, two or even all three emissions according to FIGS. 2 to 4. Moreover, the first luminescent substance can be excited by means of a light source and the ratio of the emission of the first luminescent substance to the emission of the second luminescent substance can be determined. Security from forgery can be improved even further by considering this ratio.

The security element 1 can simply be produced in a printing step when printing ink is used which comprises the first luminescent substance and the second luminescent substance.

It has further proven to be appropriate for ensuring a high security against forgery when the first luminescent substance and the second luminescent substance are merely present in low concentrations in the security element because thus the finding of these substances is made more difficult for forgers. Especially when using an up converter it is possible by providing the up converter as an externally excited substance of the security element 1 to achieve a sufficient quality of the security element 1 even with a low concentration of the luminescent substances which allows reliable detection. The security element 1 can be realized by printing in a simple and cost-effective manner as a result of the low concentrations. Moreover, the choice of a low concentration can make the finding of the security feature by a forger more difficult. In other embodiments, the security element 1 can also be arranged as an adhesive film, as a component of a hologram, or as a strip element or the like.

In addition to the first luminescent substance and the second luminescent substance, the security element 1 can comprise further security features such as a further luminescent substance.

What is claimed is:

1. A security element for a security document, comprising:

a first luminescent substance which is thermally unstable, when a base material of the security document reaches a threshold temperature; and a second luminescent substance;

wherein the first and second luminescent substances are constructed to allow an energy transmission therebetween, with an excitation frequency range of one of the first and second luminescent substances corresponding to an emission frequency range of the other one of the first and second luminescent substances, wherein the first and second luminescent substances jointly define a common first region, and wherein the first luminescent substance defines a second region.

2. The security element of claim 1, wherein the threshold temperature is an ignition temperature of the base material.

3. The security element of claim 1, wherein the threshold temperature is 185° C.

4. The security element of claim 1, wherein the first luminescent substance and the second luminescent substance define a predeterminable ratio.

5. The security element of claim 1, wherein the first luminescent substance has a concentration which increases in one direction.

6. The security element of claim 1, wherein the second luminescent substance defines a third region.

7. The security element of claim 1, wherein the first luminescent substance is configured to have an emission frequency range which is higher than an excitation frequency range thereof.

8. The security element of claim 1, wherein the second luminescent substance is configured to have an excitation frequency range which corresponds to an emission frequency range of the first luminescent substance.

9. The security element of claim 1, wherein the first luminescent substance is configured to have an emission frequency range in a visible range.

10. The security element of claim 1, wherein the second luminescent substance is configured to have an emission frequency range which is lower than an excitation frequency range thereof.

11. A security document, comprising:

a base body made of a base material; and a security element including a first luminescent substance which is thermally unstable, when a base material of the security document reaches a threshold temperature; and a second luminescent substance;

wherein the first and second luminescent substances are constructed to allow an energy transmission therebetween, with an excitation frequency range of one of the first and second luminescent substances corresponding to an emission frequency range of the other one of the first and second luminescent substances, wherein the first and second luminescent substances jointly define a common first region, and wherein the first luminescent substance defines a second region.

12. A method for verifying the authenticity and/or quality of a security document, comprising the steps of;

exciting a first luminescent substance of a security element by a light source;

exciting a second luminescent substance by an emission of the first luminescent substance; and determining a ratio of the emission of the first luminescent substance to an emission of the second luminescent substance.

* * * * *